US012770759B2

(12) United States Patent
Wang et al.

(10) Patent No.: US 12,770,759 B2
(45) Date of Patent: Oct. 20, 2026

(54) CABLE STRUCTURE, CABLE COOLING DEVICE AND VEHICLE

(71) Applicant: Changchun Jetty Automotive Technology Co., Ltd., Changchun (CN)

(72) Inventors: Chao Wang, Changchun (CN); Yong Liu, Changchun (CN)

(73) Assignee: Chancgchun Jetty Automotive Technology Co., Ltd., Changchun (CN)

( * ) Notice: Subject to any disclaimer, the term of this patent is extended or adjusted under 35 U.S.C. 154(b) by 220 days.

(21) Appl. No.: 18/707,868

(22) PCT Filed: Nov. 8, 2022

(86) PCT No.: PCT/CN2022/130592
§ 371 (c)(1),
(2) Date: May 6, 2024

(87) PCT Pub. No.: WO2023/078456
PCT Pub. Date: May 11, 2023

(65) Prior Publication Data

US 2025/0157694 A1 May 15, 2025

(30) Foreign Application Priority Data

Nov. 8, 2021 (CN) ......................... 202111313327.0

(51) Int. Cl.
*H01B 7/42* (2006.01)
*B60L 53/302* (2019.01)
(Continued)

(52) U.S. Cl.
CPC ............ *H01B 7/425* (2013.01); *B60L 53/302* (2019.02); *H01B 7/324* (2013.01)

(58) Field of Classification Search
CPC ......... B60L 53/302; H01B 7/425; H01B 7/42; H01B 7/324; H01B 7/421; H01B 7/423; H02G 3/03
See application file for complete search history.

(56) References Cited

U.S. PATENT DOCUMENTS

2015/0300753 A1 10/2015 Sakai
2019/0199075 A1* 6/2019 Sugimura .............. H01B 9/006
(Continued)

FOREIGN PATENT DOCUMENTS

CN 201122454 9/2008
CN 102800424 A 11/2012
(Continued)

OTHER PUBLICATIONS

First Office Action dated Apr. 26, 2024, for Chinese Application No. 202111313327.0.
(Continued)

*Primary Examiner* — Timothy J Thompson
*Assistant Examiner* — Amol H Patel
(74) *Attorney, Agent, or Firm* — Renner, Otto, Boisselle & Sklar, LLP

(57) ABSTRACT

The present disclosure provides a cable, a cable cooling device, and a vehicle. The cable includes a cable body and a cooling jacket, where the cooling jacket is wound around the cable body; and the cooling jacket is provided with a lumen, is connected to an inlet joint of water and a return joint of water which communicate with the lumen, and is constructed so that cooling liquid enters the lumen through the inlet joint of water and flows out through the return joint of water. With the present disclosure, the technical problem that the cable is difficult to cool is solved.

20 Claims, 8 Drawing Sheets

(51) Int. Cl.
*H01B 7/32* (2006.01)
*H02G 3/03* (2006.01)

(56) References Cited

U.S. PATENT DOCUMENTS

| | | | | |
|---|---|---|---|---|
| 2019/0214161 | A1* | 7/2019 | Chen | B60L 50/64 |
| 2019/0385765 | A1 | 12/2019 | Lyon | |
| 2024/0317092 | A1* | 9/2024 | Li | B60L 53/16 |

FOREIGN PATENT DOCUMENTS

| | | | | | |
|---|---|---|---|---|---|
| CN | 102930932 | A | | 2/2013 | |
| CN | 206098029 | U | * | 4/2017 | |
| CN | 110600168 | A | | 12/2019 | |
| CN | 210271862 | | | 4/2020 | |
| CN | 210984367 | U | | 7/2020 | |
| CN | 112770929 | A | | 5/2021 | |
| CN | 113192667 | A | * | 7/2021 | H01R 31/06 |
| CN | 216212525 | U | | 4/2022 | |
| JP | H0982145 | A | | 3/1997 | |
| JP | H10108376 | A | | 4/1998 | |
| JP | H10321055 | A | | 12/1998 | |
| JP | 2008292057 | A | | 12/2008 | |

OTHER PUBLICATIONS

Search Report dated Apr. 26, 2024, for Chinese Application No. 202111313327.0.

International Search Report mailed Jan. 10, 2023, for International Application No. PCT/CN2022/130592.

Extended European Search Report issued for corresponding European Patent Application No. 22889477.0, mailed Jan. 28, 2025.

First Office Action issued for corresponding Japanese Patent Application 2024-525901 mailed Jul. 15, 2025 and its English translation.

First Office Action issued on Sep. 19, 2025 for counterpart European patent application No. 22889477.0.

* cited by examiner

CABLE STRUCTURE, CABLE COOLING DEVICE AND VEHICLE

RELATED APPLICATION

This application is a National Stage of International Application No. PCT/CN2022/130592, filed on Nov. 8, 2022, which claims priority to Chinese Patent Application No. 202111313327.0, filed on Nov. 8, 2021, both of which are hereby incorporated by reference in their entireties.

FIELD OF TECHNOLOGY

The present disclosure relates to the technical field of electrical equipment, and in particular, to a cable structure, a cable cooling device and a vehicle.

BACKGROUND

Long charging time of current electric vehicles has become a bottleneck restricting their widespread use. At present, the current for fast charging of electric vehicles reaches 150-400 A. The high current brings about high heat output of a charging cable, which is also the main reason for restricting the charging current of the electric vehicles.

In order to solve this problem, firstly, the cross-sectional area of the cable urgently needs to be enlarged to reduce the heat output of the cable, but the cost of the cable will be greatly increased. Secondly, the cable is cooled with a cooling technology.

At the current stage, liquid cooling and air cooling technologies are mostly used in cooling of high-current charging cables. While the liquid cooling technology has a good cooling effect, an additional cooling pipeline needs to be added in the cable, resulting in a complex system structure, extremely high requirements for safety and stability, and increased cost. The air cooling technology has the problems of low cooling efficiency, additional noise, and influence on noise, vibration and harshness (NVH) of a complete vehicle due to limited mounting dimension and space.

Therefore, a cable capable of being quickly cooled is urgently needed in the field of current transmission.

SUMMARY

An objective of the present disclosure is to provide a cable structure, a cable cooling device, and a vehicle, so as to alleviate the technical problem that the cable is difficult to cool.

The above objective of the present disclosure may be achieved with the following technical solutions:

The present disclosure provides a cable structure, including a cable body and a cooling jacket, where the cooling jacket is wound around the cable body.

The present disclosure provides a cable cooling device, including a cooling jacket, a pump, and a cooling system, where the cooling jacket can be wound around a cable body; and the cooling jacket is provided with a lumen, is connected to an inlet joint of water and a return joint of water which communicate with the lumen, and is configured to cooling liquid enters the lumen through the inlet joint of water and flows out through the return joint of water, and the pump and the cooling system are connected to the inlet joint of water and the return joint of water.

The present disclosure provides a vehicle, including a pump, a cooling system, and the above cable structure, where the pump and the cooling system are connected to an inlet joint of water and a return joint of water.

The present disclosure has the following characteristics and advantages:

1. The cooling jacket is attached to the cable body, the cooling jacket absorbs heat of the cable body, and the cooling liquid flows through the cooling jacket to take away the heat, such that the cable body is cooled, and the temperature rise of a cable circuit is significantly decreased. The cooling jacket is wound and matched with the cable body, and can deform along with the cable body, has a good attachment property, can be matched according to the outer diameter of the cable body, and has the advantage of being simple and flexible to assemble.
2. The inlet joint of water and the return joint of water are disposed at one end or two ends of a cable respectively, and the arrangement mode can be selected based on the length of the cable and the specific environment for assembly, such that a better assembly and cooling solution is implemented.
3. The cooling jacket is spiral and the inner diameter of the cooling jacket is less than the inner diameter of the cable, such that the cooling jacket can be conveniently wound around the cable and in close contact with the cable, thereby implementing better heat transfer.
4. The temperature sensor is disposed so that the real-time temperature of the cable can be quickly obtained, and the pump and the cooling system can be used in a timely manner for temperature adjustment.
5. The cooling jacket is assembled on the periphery of the cable body, instead of being integrated with the cable body; when damaged, the cooling jacket can be directly replaced without disassembling the cable body; the cooling jacket is wound around the cable body in a spiral mode, such that the cable body does not need to be powered off when disassembled, thereby facilitating repair and replacement; moreover, the cable body is protected by an external insulating layer, such that when the cooling jacket leaks the cooling liquid, the cable body will not be short-circuited.

BRIEF DESCRIPTION OF THE DRAWINGS

The following drawings are only intended to schematically illustrate and explain the present disclosure and do not limit the scope of the present disclosure. In the drawings.

DESCRIPTION OF THE EMBODIMENTS

Figure 1:
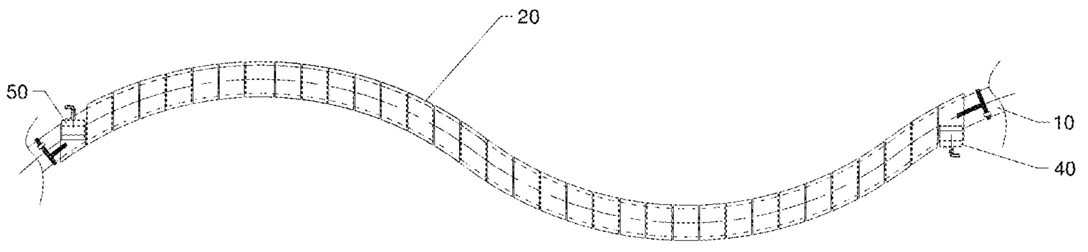
FIG. 1 shows a schematic structural diagram of an embodiment of a cable provided by the present disclosure.

To understand the technical features, objective, and effects of the present disclosure more clearly, specific embodiments of the present disclosure are now described with reference to the accompanying drawings. In the description of the present disclosure, "a plurality of" means two or more, unless otherwise stated.

Embodiments of Solution 1

The present disclosure provides a cable structure. As shown in FIG. 1 to FIG. 15, the cable structure includes a cable body 10 and a cooling jacket 20, where the cooling jacket 20 is wound around the cable body 10; and the cooling jacket 20 is provided with a lumen 30, is connected to an inlet joint of water 40 and a return joint of water 50 which communicate with the lumen 30, and is constructed so that cooling liquid enters the lumen 30 through the inlet joint of water 40 and flows out through the return joint of water 50.

The cooling jacket 20 is attached to the cable body 10, the cooling jacket 20 absorbs heat of the cable body 10, and the cooling liquid flows through the cooling jacket 20 to take away the heat, such that the cable body 10 is cooled, and the temperature rise of a cable circuit is significantly decreased. The cooling jacket 20 is wound and matched with the cable body 10, and can deform along with the cable body 10, has a good attachment property, can be matched according to the outer diameter of the cable body 10, and has the advantage of being simple and flexible to assemble.

The cable structure may be applied to an electric vehicle, and the cable body 10 may be a high-power cable for the electric vehicle. The cooling jacket 20 may be made from polyvinyl chloride (PVC) or silica gel.

Figure 6:
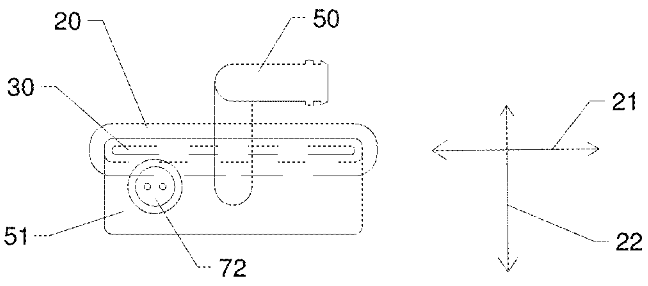
Figure 7:
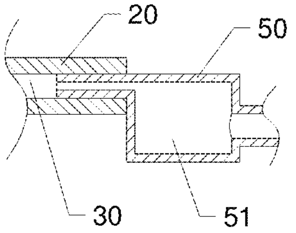
Figure 8:
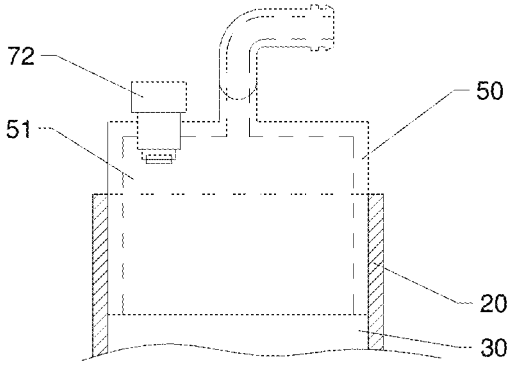
Figure 12:
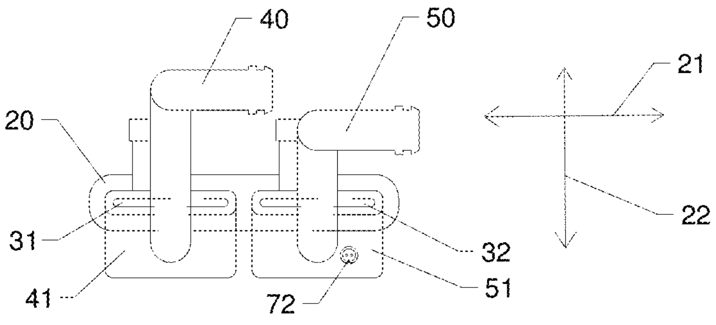
Figure 13:
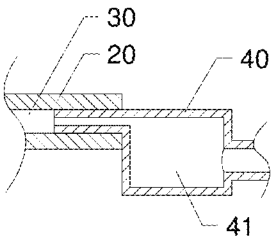
Figure 14:
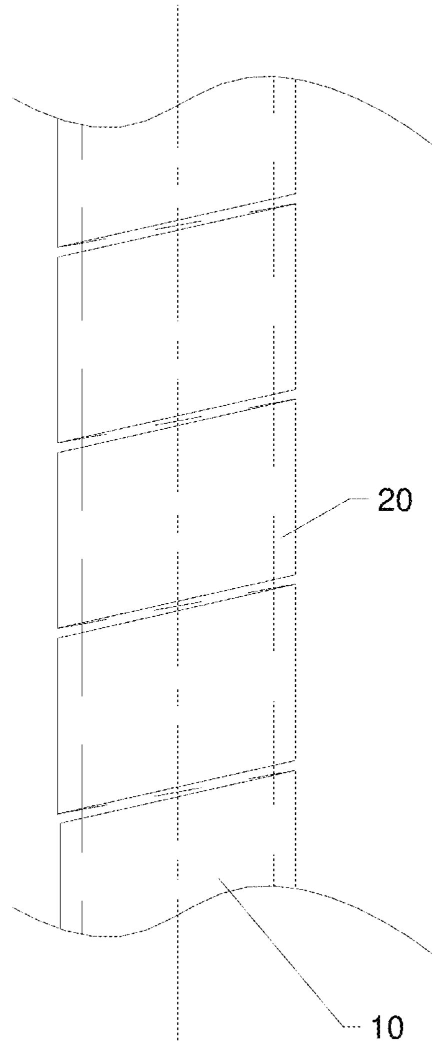
FIG. 14 to FIG. 18 show schematic diagrams of matching between a cable body and a cooling jacket in a cable structure provided by the present disclosure.

A cross section of the lumen 30 has a width direction 21 and a thickness direction 22, and a sidewall of the lumen 30 in the width direction 21 is in contact with the cable body 10. The cross section of the lumen 30 is flat, and a dimension of the lumen 30 in the width direction 21 is greater than a dimension of the lumen 30 in the thickness direction 22. In an embodiment, as shown in FIG. 6 and FIG. 12, the sidewall of the lumen 30 has a large area of contact with the cable body 10, which facilitates the cooling jacket 20 to absorb heat of the cable body 10. For example, the cross section of the lumen 30 is rectangular.

In an embodiment, a ratio of a dimension in a width direction 21 to a dimension in a thickness direction 22 of the lumen 30 ranges from 1:1 to 10:1. The cooling effect of the cooling jacket 20 is determined by the dimensions of the lumen 30 in the width and thickness directions. To verify the influence of the ratio of the dimension in the width direction to the dimension in the thickness direction of the lumen 30 on the performance of the cooling jacket 20, ten cables with the same sectional area, material, and length are selected by the inventor and applied with the same current, jacket cavities 30 with different ratios of dimensions in width directions to dimensions in thickness directions are used to cool the cables, and temperature rises of the cables are obtained and recorded in Table 1.

The experimental method is that in a closed environment, cables with jacket cavities 30 with different ratios of dimensions in width directions to dimensions in thickness directions are used and applied with the same current, stable temperatures before and after power on are recorded, difference operations are made, and absolute values are taken. In this embodiment, the temperature rise of less than 50 K is a qualified value.

TABLE 1

Influence of jacket cavities 30 with different ratios of dimensions in width directions to dimensions in thickness directions on temperature rises of cable structure

| Ratio of dimension in width direction to dimension in thickness direction of lumen 30 | | | | | | | | | | | | |
|---|---|---|---|---|---|---|---|---|---|---|---|---|
| 0.5:1 | 0.8:1 | 1:1 | 2:1 | 3:1 | 5:1 | 6:1 | 7:1 | 8:1 | 9:1 | 10:1 | 11:1 | 12:1 |
| Temperature rise (K) of cable structure | | | | | | | | | | | | |
| 63.8 | 52.5 | 49.6 | 47.7 | 45.2 | 43.5 | 41.4 | 37.1 | 33.2 | 30.9 | 27.5 | 50.8 | 52.3 |

It can be seen from the above table that when the ratio of the dimension in the width direction 21 to the dimension in the thickness direction 22 of the lumen 30 is less than 1:1, the dimension in the width direction 21 of the lumen 30 is less than the dimension in the thickness direction 22 of the lumen 30, the area of contact between the sidewall of the lumen 30 and the cable body 10 is small so that the cooling jacket 20 is not facilitated to absorb heat of the cable body 10, and the temperature rise of the cable structure is greater than the qualified value; and when the ratio of the dimension in the width direction to the dimension in the thickness direction of the lumen 30 is greater than 10:1, since there is no internal support structure in the middle of the lumen 30 in the width direction, the too large width easily causes inner walls in the middle of the lumen 30 to be in contact with each other, the velocity of the cooling liquid passing through the cooling jacket 20 is reduced, the cooling effect is weakened, and the temperature rise of the cable structure is greater than the qualified value. Therefore, the ratio of the dimension in the width direction to the dimension in the thickness direction of the lumen 30 is set by the inventor to a range from 1:1 to 10:1.

In an embodiment, the lumen 30 includes a first cavity 31 and a second cavity 32 which are formed side by side. As shown in FIG. 2, FIG. 4, and FIG. 11 to FIG. 13, a connection channel 34 is disposed at a first end of the cooling jacket 20, and the connection channel 34 communicates with the first cavity 31 and the second cavity 32 separately; the inlet joint of water 40 and the return joint of water 50 are both disposed at a second end of the cooling jacket 20; moreover, the inlet joint of water 40 communicates with the first cavity 31, and the return joint of water 50 communicates with the second cavity 32.

Figure 11:
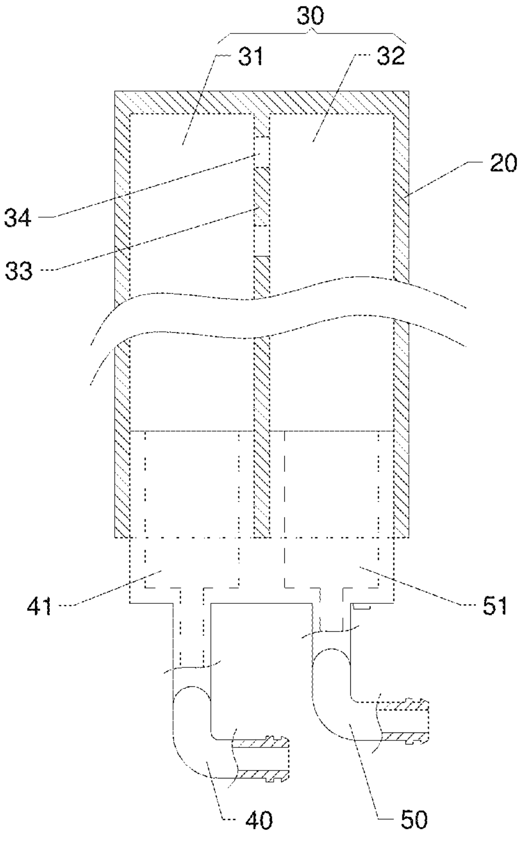
FIG. 11 to FIG. 13 show schematic diagrams of an outlet water connector and an inlet joint of water and a connecting structure thereof in the cable structure shown in FIG. 2.

Further, a sidewall of the first cavity 31 and a sidewall of the second cavity 32 are both in contact with the cable body 10. As shown in FIG. 11 and FIG. 12, the first cavity 31 and the second cavity 32 are distributed along the width direction 21. The sidewall of the first cavity 31 in the width direction 21 and the sidewall of the second cavity 32 in the width direction 21 are both in contact with the cable body 10, such that the cooling liquid can absorb heat of the cable body 10 in both inflow and outflow processes, and the cooling liquid is facilitated to give full play to its cooling efficiency.

As shown in FIG. 11, the cooling jacket 20 includes a lumen partition 33 disposed between the first cavity 31 and the second cavity 32. The lumen partition 33 separates the first cavity 31 from the second cavity 32, such that the cooling liquid flows from the second end of the cooling jacket 20 through the first cavity 31 to the first end of the cooling jacket 20, and then flows through the second cavity 32 to the second end of the cooling jacket 20. A structural form of the connection channel 34 is not limited to one. For example, the connection channel 34 is a communicating tube with one end communicating with the first cavity 31 and the other end communicating with the second cavity 32. In an embodiment of the present disclosure, the connection channel 34 is a through hole formed in the lumen partition 33.

In another embodiment, as shown in FIG. 1, FIG. 3, and FIG. 5 to FIG. 10, the inlet joint of water 40 and the return joint of water 50 are disposed at two ends of the cooling jacket 20 respectively, and the cooling liquid flows unidirectionally through the cooling jacket 20.

Figure 2:
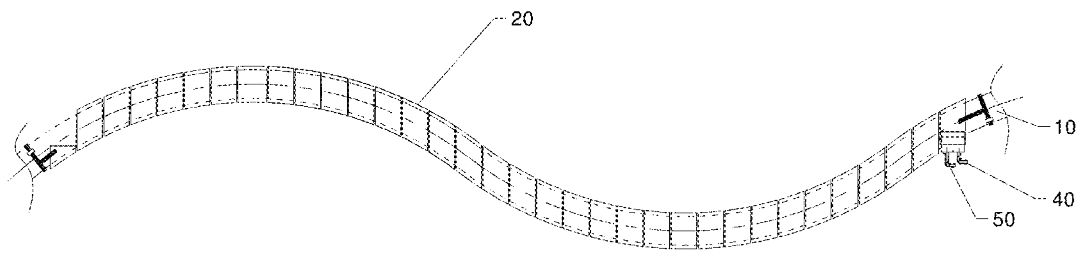
FIG. 2 shows a schematic structural diagram of another embodiment of a cable provided by the present disclosure.
Figure 3:
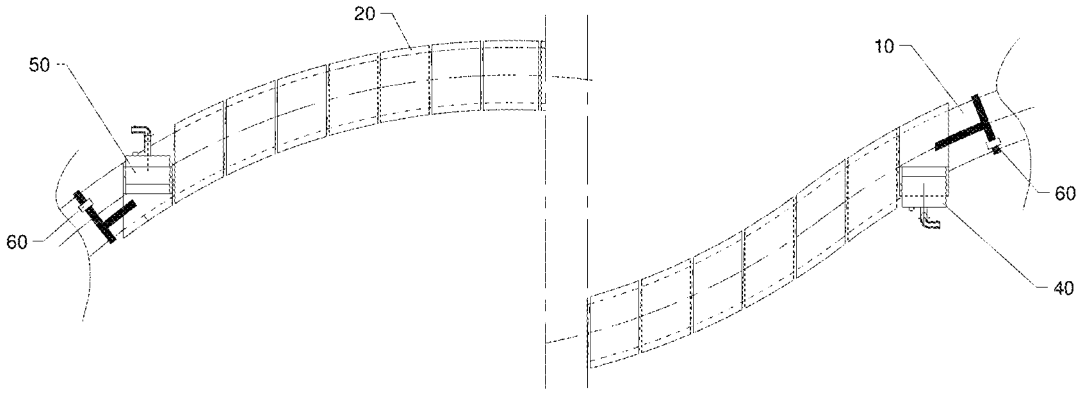
FIG. 3 shows an enlarged view of the cable structure shown in FIG. 1.
Figure 4:
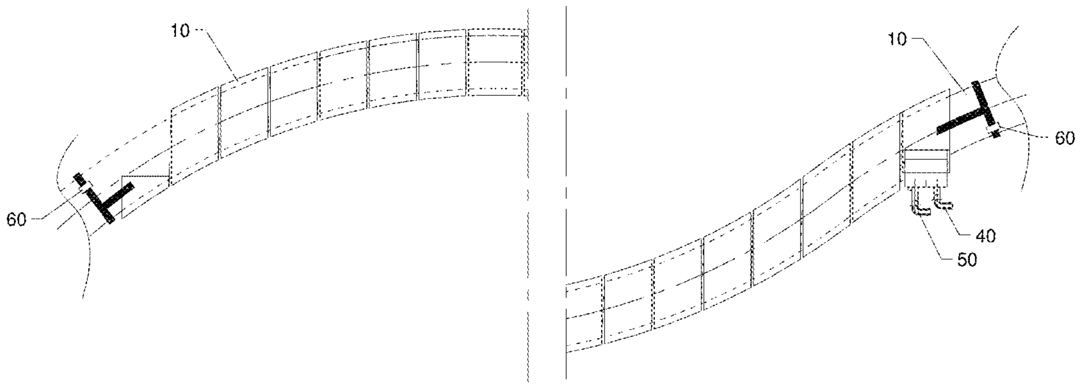
FIG. 4 shows an enlarged view of the cable structure shown in FIG. 2.

The application of the cable structure is relatively flexible. The embodiment that the inlet joint of water 40 and the return joint of water 50 are disposed at two ends as shown in FIG. 1, or the embodiment that the inlet joint of water 40 and the return joint of water 50 are disposed at the same end as shown in FIG. 2 can be selected according to an application environment, such as considering an arrangement and mounting process for high-voltage electrical equipment of a complete vehicle, so as to flexibly match a general arrangement and general assembly process route.

In an embodiment, the return joint of water 50 is provided with a return water buffer cavity 51. As shown in FIG. 6 to FIG. 8, FIG. 12, and FIG. 13, a cross-sectional area of the return water buffer cavity 51 is greater than a cross-sectional area of the lumen 30 communicating with the return joint of water 50. The return water buffer cavity 51 plays a role in buffering the cooling liquid, such that a flow velocity of the cooling liquid is more stable, the cooling liquid is facilitated to absorb heat of the cable body 10, and the stability of heat transfer is ensured.

In an embodiment, the inlet joint of water 40 is provided with an inlet water buffer cavity 41. As shown in FIG. 9 to FIG. 12, a cross-sectional area of the inlet water buffer cavity 41 is larger than a cross-sectional area of the lumen 30 communicating with the inlet joint of water 40. The inlet water buffer cavity 41 plays a role in buffering the cooling liquid, such that the flow velocity of the cooling liquid is more stable, the cooling liquid is facilitated to absorb heat of the cable body 10, and the stability of the cooling efficiency is ensured.

As shown in FIG. 7, FIG. 8, FIG. 10, and FIG. 13, the inlet joint of water 40 is sleeved on the cooling jacket 20, and the return joint of water 50 is sleeved on the cooling jacket 20. Further, the inlet joint of water 40 is inserted into the cooling jacket 20, and the return joint of water 50 is inserted into the cooling jacket 20, such that the inlet joint of water 40 and the cooling jacket 20 can be assembled more conveniently, and the return joint of water 50 and the cooling jacket 20 can be assembled more conveniently.

Furthermore, the inlet joint of water 40 is in interference fit with the cooling jacket 20, and a rubber layer is disposed between the inlet joint of water 40 and the cooling jacket 20; and the return joint of water 50 is in interference fit with the cooling jacket 20, and a rubber layer is disposed between the return joint of water 50 and the cooling jacket 20, such that the inlet joint of water 40 is connected to the cooling jacket 20 more tightly, and the return joint of water 50 is connected to the cooling jacket 20 more tightly, thereby improving the sealing performance.

In an embodiment of the present disclosure, the cooling jacket 20 is spiral in a free state and has elasticity, such that the cooling jacket 20 can be conveniently wound around outside of the cable body 10. The cooling jacket 20 may deform along with the cable body 10, such that the cooling jacket 20 is more tightly connected to the cable body 10. The cooling jacket 20 has the characteristic of automatic shape recovery, which is beneficial to matching an inner diameter of the cooling jacket 20 with an outer diameter of a cable, maintaining a certain interference fit, and ensuring the closeness of fit.

In an embodiment, a dimension in a width direction of the cooling jacket 20 in an assembled state accounts for 40-98% of a screw pitch. In the assembled state, the screw pitch of the cooling jacket 20 is a distance between the centers of two adjacent cooling jackets 20 along an axial direction of the cable body 10. When the percentage of the dimension in the width direction of the cooling jacket 20 in the screw pitch is too small, the cover area of the cooling jacket 20 on the cable body 10 is too small, the cooling effect cannot be achieved, and the temperature rise of the cable body 10 is unqualified. When the percentage of the dimension in the width direction of the cooling jacket 20 in the screw pitch is too large, although the temperature rise is qualified, the cooling jacket 20 is too tight, which easily leads to poor flexibility of the cable and failure of assembly.

To verify the influence of the percentage of the dimension in the width direction of the cooling jacket 20 in the screw pitch on the temperature rise of the cable structure, ten cables with the same sectional area, material, and length are selected by the inventor and applied with the same current, where percentages of dimensions in width directions of cooling jackets 20 in a screw pitch are different, the cables are cooled, and temperature rises of the cables are read and recorded in Table 2. According to an experimental method, in a closed environment, cables with cooling jackets 20 with different percentages of dimensions in width directions in a screw pitch are used and applied with the same current, stable temperatures before and after power on are recorded, difference operations are made, and absolute values are taken. In this embodiment, the temperature rise of less than 50 K is an qualified value.

To verify the influence of the percentage of the dimension in the width direction of the cooling jacket 20 in the screw pitch on the bending property of the cable structure, ten cables with the same sectional area, material, and length are selected by the inventor, the cables are bent to reach the maximum radian, an angle between a tangent line at one end of a circular arc and a tangent line at a midpoint of the circular arc is measured, and the angle is recorded in Table 2, where percentages of dimensions in width directions of cooling jackets 20 in a screw pitch are different. In this experiment, the angle of greater than 30° is an qualified value.

TABLE 2

Influence of jacket cavities 20 with different percentages of dimensions in width directions in screw pitch on temperature rises and flexibility of cable structure

| Percentage (%) of dimension in width direction of cooling jacket 20 in screw pitch | | | | | | | | | |
|---|---|---|---|---|---|---|---|---|---|
| 20 | 30 | 40 | 50 | 60 | 70 | 90 | 98 | 100 | 110 |
| Temperature rise (K) of cable structure | | | | | | | | | |
| 63.8 | 52.5 | 48.7 | 43.2 | 41.5 | 38.4 | 37.1 | 34.2 | 33.9 | 33.8 |
| Bending angle (°) of cable structure | | | | | | | | | |
| 105 | 96 | 85 | 77 | 68 | 53 | 46 | 35 | 28 | 22 |

As shown in FIG. 2, when the percentage of the dimension in the width direction of the cooling jacket 20 in the screw pitch is less than 40%, the cover area of the cooling jacket 20 on the cable body 10 is too small, the cooling effect cannot be achieved, and the temperature rise of the cable body 10 is unqualified. When the percentage of the dimension in the width direction of the cooling jacket 20 in the screw pitch is greater than 98%, although the temperature rise of the cable body 10 is qualified, the temperature rise is not significantly decreased, and the cable structure has an unqualified bending angle and poor bending property and flexibility, which easily leads to failure of assembly. Therefore, the percentage of the dimension in the width direction of the cooling jacket 20 in the screw pitch is selected by the inventor to range from 40% to 98%.

Figure 15:
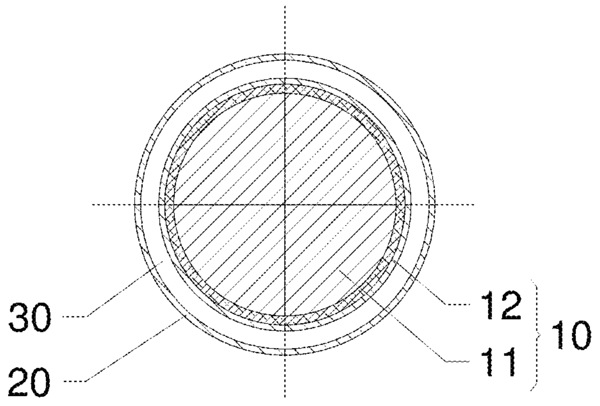
Figure 16:
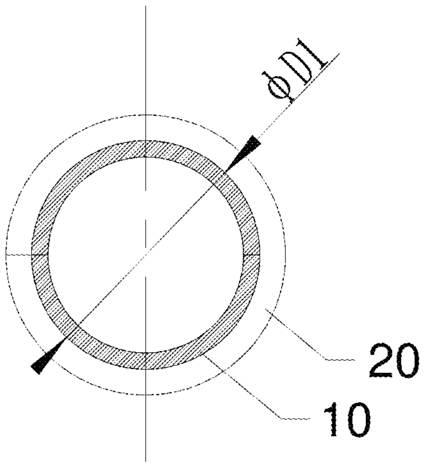
Figure 17:
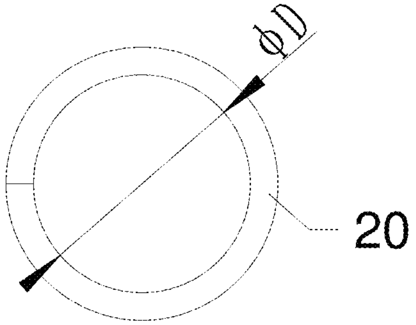
Figure 18:
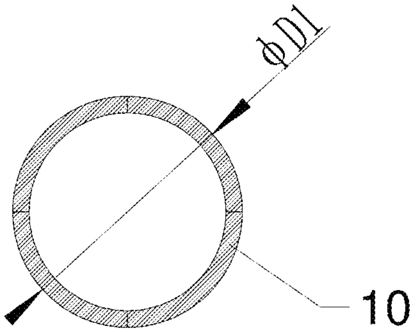

Further, the inner diameter of the cooling jacket 20 in the free state is less than the outer diameter of the cable body 10. As shown in FIG. 15 to FIG. 18, the inner diameter of the cooling jacket 20 in the free state is denoted as D, and the outer diameter of the cable body 10 is denoted as D1, where D1≥D. The cooling jacket 20 is in interference fit with the cable body 10, such that the cooling jacket 20 is closely attached to the cable body 10. As shown in FIG. 15, the cable body 10 includes a cable core 11 and a cable insulating sheath 12, where a sidewall of the cooling jacket 20 is closely attached to a sidewall of the cable insulating sheath 12.

this range, the sidewall of the cooling jacket 20 can be closely attached to the outer wall of the cable body 10, so as to ensure efficient heat transfer and cooling efficiency.

Figure 5:
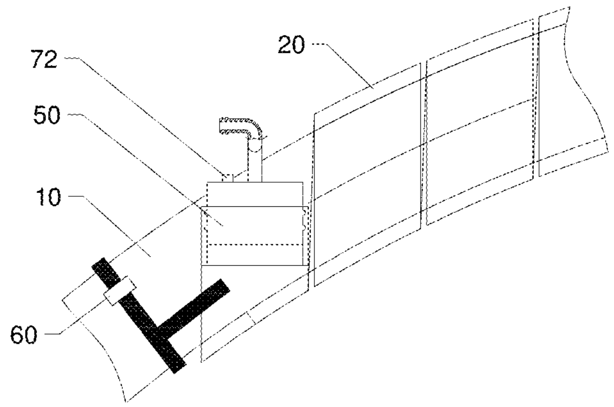
FIG. 5 to FIG. 8 show schematic diagrams of an outlet water connector and a connecting structure thereof in the cable structure shown in FIG. 1.
Figure 9:
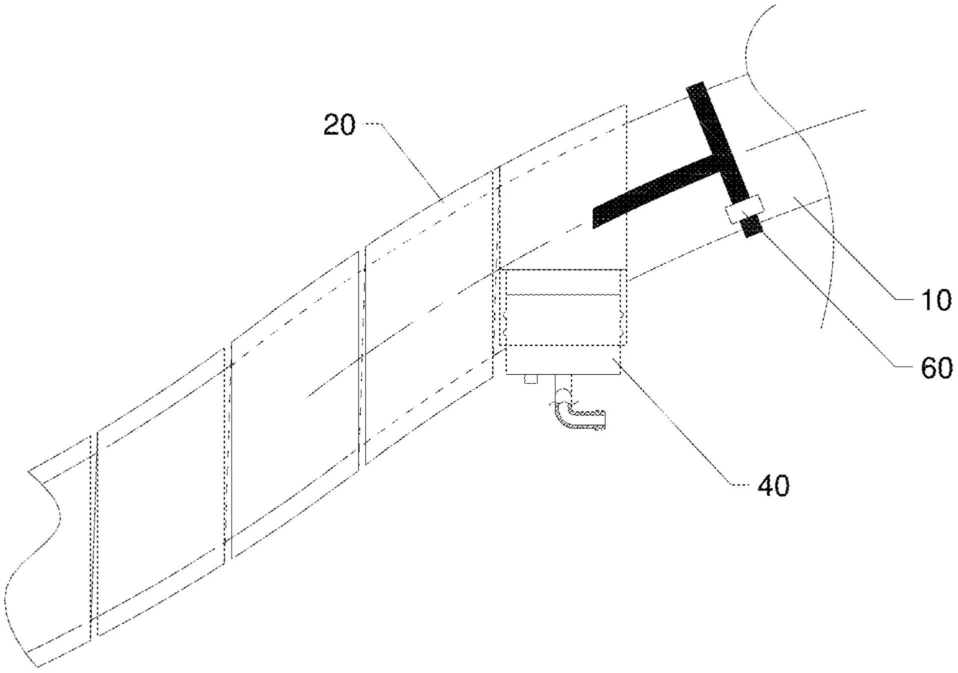
FIG. 9 and FIG. 10 show schematic diagrams of an inlet joint of water and a connecting structure thereof in the cable structure shown in FIG. 1.
Figure 10:
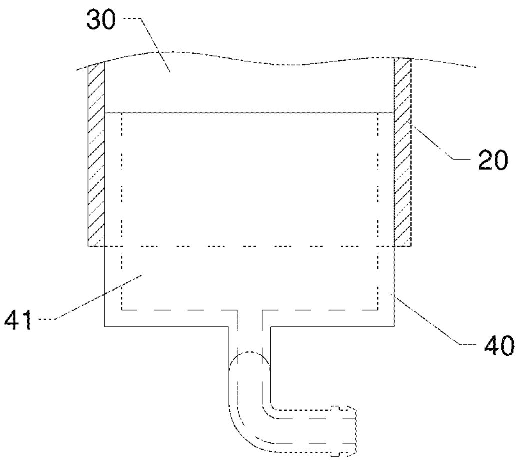

As shown in FIG. 5 and FIG. 9, the cooling jacket 20 and the cable body 10 may be fixed by a fixing tie strap 60. The fixing tie strap 60 can prevent the cooling jacket 20 from moving axially, such that the cooling jacket 20 is connected to the cable body 10 more firmly. The fixing tie strap 60 and the cooling jacket 20 may be connected to each other by means of gluing. Cooling jackets 20 with different inner diameters are matched according to the outer diameter of the cable body 10. The cooling jacket 20 may deform with the cable body and has a good attachment property. The cable can be mounted quickly, and the mounting process is simple and flexible. The cooling jacket 20 is tightly combined with the cable body 10 to achieve a good cooling effect on the cable body 10.

In an embodiment, the return joint of water 50 is connected to a temperature sensor 72. The temperature sensor 72 can provide a positive temperature coefficient or negative temperature coefficient (PTC or NTC) signal to a cooling controller 71 and provide the cooling controller 71 with cooling liquid temperature information, and the cooling controller 71 can systematically adjust power of a pump 84 and a heat exchange system by the temperature sensor 72 to improve the cooling effect.

In an embodiment, a cooling rate of the cooling jacket 20 ranges from 0.3 K/s to 10 K/s. To verify the influence of the cooling rate of the cooling jacket 20 on the temperature rise of the cable 10, ten cables with the same sectional area, material, and length are selected by the inventor and applied with the same current, cooling jackets 20 with different cooling rates are used to cool the cables, and temperature rises of the cables are obtained and recorded in Table 3.

The experimental method is that, in a closed environment, cables with cooling jackets 20 with different cooling rates are used and applied with the same current, stable temperatures before and after power on are recorded, difference operations are made, and absolute values are taken. In this embodiment, the temperature rise of less than 50 K is an qualified value.

TABLE 3

Influence of cooling jackets 20 with different cooling rates on temperature rises of cable structure

| Cooling rate of cooling jacket 20 | | | | | | | | | | | | |
|---|---|---|---|---|---|---|---|---|---|---|---|---|
| 0.01 | 0.03 | 0.3 | 0.5 | 1 | 3 | 5 | 7 | 8 | 9 | 10 | 11 | 13 |
| Temperature rise (K) of cable structure | | | | | | | | | | | | |
| 63.8 | 52.5 | 49.6 | 47.7 | 45.2 | 43.5 | 41.4 | 37.1 | 33.2 | 30.9 | 27.5 | 26.8 | 26.5 |

To ensure that the sidewall of the mounted cooling jacket 20 is closely attached to an outer wall of the cable body 10, it is necessary to ensure that a radial force Fr applied by the mounted cooling jacket 20 to the cable body 10 is greater than or equal to 2N. According to an actual mounting environment and a requirement on the acceptable outer diameter for a high voltage circuit, a radial deformation amount ΔD of the assembled cooling jacket 20 ranges from 4 mm to 8 mm, where ΔD=D1−D. Therefore, an elastic modulus M of the cooling jacket 20 in a linear elastic deformation range is greater than or equal to Fr/ΔD. Within It can be seen from the above table that when the cooling rate of the cooling jacket 20 is less than 0.3 K/s, the temperature rise of the cable structure is less than the qualified value, and the higher the cooling rate of the cooling jacket 20 is, the lower the temperature rise is. When the cooling rate of the cooling jacket 20 is greater than 10 K/s, due to the influence of heat output of the cable itself and power of the cooling jacket 20 itself, the temperature rise is not significantly decreased, but the power of the cooling jacket 20 increases, which is not economical. Therefore, the cooling rate of the cooling jacket 20 is set by the inventor to 0.3-10 K/s.

Embodiments of Solution 2

The present disclosure provides a cable cooling device, including a cooling jacket 20, where the cooling jacket 20 can be wound around a cable body 10; and the cooling jacket 20 is provided with a lumen 30, is connected to an inlet joint of water 40 and a return joint of water 50 which communicate with the lumen 30, and is configured to cooling liquid enters the lumen 30 through the inlet joint of water 40 and flows out through the return joint of water 50.

The cable cooling device is capable of cooling the cable body 10 and may be applied to a vehicle, and the cable body 10 may be a high-power cable for the electric vehicle.

The cable cooling device includes a pump 84 and a cooling system 80, where the pump 84 and the cooling system 80 are connected to the inlet joint of water 40 and the return joint of water 50, the cooling system 80 cools the cooling liquid, and the pump 84 conveys the cooling liquid to the inlet joint of water 40 for cooling the cable body 10. When applied to the vehicle, the cable cooling device can be connected into a heat exchange system for the complete vehicle, where the heat exchange system for the complete vehicle functions as the pump 84 and the cooling system 80. The pump 84 and the cooling system 80 may also be built separately.

Figure 19:
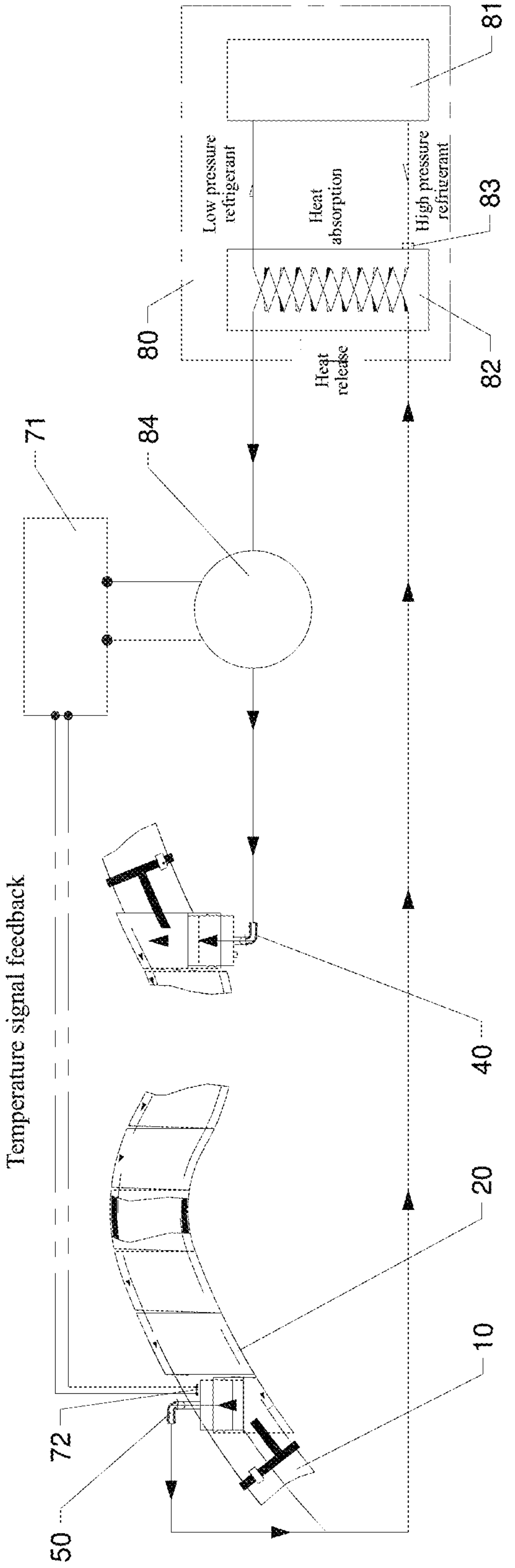
FIG. 19 shows a schematic diagram of a cable cooling device provided by the present disclosure.

As shown in FIG. 19, the cooling system 80 includes a refrigeration system 81 and a heat exchanger 82, where an expansion valve 83 is disposed between the refrigeration system 81 and the heat exchanger 82. A cooling controller 71 is electrically connected to the pump 84.

Solution 3

The present disclosure provides a vehicle, including a pump 84, a cooling system 80, and the above cable structure, where the pump 84 and the cooling system 80 are connected to an inlet joint of water 40. The cooling system 80 cools cooling liquid, and the pump 84 conveys the cooling liquid to the inlet joint of water 40 for cooling the cable body 10. The vehicle has the functions and effects of the above cable structure, which will not be repeated herein.

The cable body 10 in the cable structure may be a high-power cable for the electric vehicle. The cable structure can be connected into a heat exchange system for the complete vehicle, where the heat exchange system for the complete vehicle functions as the pump 84 and the cooling system 80. The pump 84 and the cooling system 80 may also be built separately.

The above are merely schematic specific embodiments of the present disclosure, and are not used to limit the scope of the present disclosure. Any equivalent changes and modifications made by those skilled in the art without departing from the conception and principle of the present disclosure shall fall within the scope of protection of the present disclosure.

What is claimed is:

1. A cable structure, comprising a cable body and a cooling jacket, wherein the cooling jacket is wound around the cable body; and the cooling jacket is provided with a lumen, is connected to an inlet joint of water and a return joint of water which communicate with the lumen, and the cooling jacket is configured to cooling liquid enters the lumen through the inlet joint of water and flows out through the return joint of water;

wherein the lumen comprises a first cavity and a second cavity arranged side by side, a connection channel is disposed at a first end of the cooling jacket, and the connection channel communicates with the first cavity and the second cavity separately;

the inlet joint of water and the return joint of water are both disposed at a second end of the cooling jacket, the inlet joint of water communicates with the first cavity, and the return joint of water communicates with the second cavity; and a sidewall of the first cavity and a sidewall of the second cavity are both in contact with the cable body.

2. The cable structure according to claim 1, wherein a cross section of the lumen is flat.

3. The cable structure according to claim 1, wherein a ratio of a dimension in a width direction to a dimension in a thickness direction of the lumen ranges from 1:1 to 10:1.

4. The cable structure according to claim 1, wherein the cooling jacket comprises a lumen partition disposed between the first cavity and the second cavity, and the connection channel is a through hole formed in the lumen partition.

5. The cable structure according to claim 1, wherein the inlet joint of water and the return joint of water are disposed at two ends of the cooling jacket respectively.

6. The cable structure according to claim 1, wherein the inlet joint of water is provided with an inlet water buffer cavity, and a cross-sectional area of the inlet water buffer cavity is greater than a cross-sectional area of the lumen communicating with the inlet joint of water;

and/or the return joint of water is provided with a return water buffer cavity, and a cross-sectional area of the return water buffer cavity is greater than a cross-sectional area of the lumen communicating with the return joint of water.

7. The cable structure according to claim 1, wherein the inlet joint of water is sleeved on the cooling jacket; and/or the return joint of water is sleeved on the cooling jacket.

8. The cable structure according to claim 7, wherein the inlet joint of water is inserted into the cooling jacket; and/or the return joint of water is inserted into the cooling jacket.

9. The cable structure according to claim 8, wherein the inlet joint of water is in interference fit with the cooling jacket, and a rubber layer is disposed between the inlet joint of water and the cooling jacket;

and/or the return joint of water is in interference fit with the cooling jacket, and a rubber layer is disposed between the return joint of water and the cooling jacket.

10. The cable structure according to claim 1, wherein the cooling jacket is spiral in a free state and has elasticity.

11. The cable structure according to claim 10, wherein an inner diameter of the cooling jacket in the free state is less than an outer diameter of the cable body.

12. The cable structure according to claim 10, wherein a dimension in a width direction of the cooling jacket in an assembled state accounts for 40-98% of a screw pitch.

13. The cable structure according to claim 1, wherein the return joint of water is connected to a temperature sensor.

14. The cable structure according to claim 1, wherein a cooling rate of the cooling jacket ranges from 0.3 K/s to 10 K/s.

15. A cable cooling device, comprising a cooling jacket, a pump, and a cooling system, wherein the cooling jacket is capable of being wound around a cable body; and the cooling jacket is provided with a lumen, is connected to an inlet joint of water and a return joint of water which communicate with the lumen, and the cooling jacket is configured to cooling liquid enters the lumen through the inlet joint of water and flows out through the return joint of water, and the pump and the cooling system are connected to the inlet joint of water and the return joint of water;

wherein the lumen comprises a first cavity and a second cavity arranged side by side, a connection channel is disposed at a first end of the cooling jacket, and the connection channel communicates with the first cavity and the second cavity separately;

the inlet joint of water and the return joint of water are both disposed at a second end of the cooling jacket, the inlet joint of water communicates with the first cavity, and the return joint of water communicates with the second cavity; and a sidewall of the first cavity and a sidewall of the second cavity are both configured to be in contact with the cable body.

16. The cable cooling device according to claim 15, wherein the inlet joint of water is provided with an inlet water buffer cavity, and a cross-sectional area of the inlet water buffer cavity is greater than a cross-sectional area of the lumen communicating with the inlet joint of water; and/or the return joint of water is provided with a return water buffer cavity, and a cross-sectional area of the return water buffer cavity is greater than a cross-sectional area of the lumen communicating with the return joint of water.

17. The cable cooling device according to claim 15, wherein the inlet joint of water is sleeved on the cooling jacket; and/or the return joint of water is sleeved on the cooling jacket.

18. A vehicle, comprising a pump, a cooling system, and a cable, wherein the cable structure comprises a cable body and a cooling jacket, and the cooling jacket is wound around the cable body;

the cooling jacket is provided with a lumen, is connected to an inlet joint of water and a return joint of water which communicate with the lumen, and the cooling jacket is configured to cooling liquid enters the lumen through the inlet joint of water and flows out through the return joint of water;

wherein the lumen comprises a first cavity and a second cavity arranged side by side, a connection channel is disposed at a first end of the cooling jacket, and the connection channel communicates with the first cavity and the second cavity separately;

the inlet joint of water and the return joint of water are both disposed at a second end of the cooling jacket, the inlet joint of water communicates with the first cavity, and the return joint of water communicates with the second cavity;

a sidewall of the first cavity and a sidewall of the second cavity are both in contact with the cable body; and the pump and the cooling system are connected to an inlet joint of water and a return joint of water.

19. The vehicle according to claim 18, wherein the inlet joint of water is provided with an inlet water buffer cavity, and a cross-sectional area of the inlet water buffer cavity is greater than a cross-sectional area of the lumen communicating with the inlet joint of water; and/or the return joint of water is provided with a return water buffer cavity, and a cross-sectional area of the return water buffer cavity is greater than a cross-sectional area of the lumen communicating with the return joint of water.

20. The vehicle according to claim 18, wherein the inlet joint of water is sleeved on the cooling jacket; and/or the return joint of water is sleeved on the cooling jacket.

* * * * *